US008737678B2

(12) United States Patent
Everingham et al.

(10) Patent No.: US 8,737,678 B2
(45) Date of Patent: May 27, 2014

(54) PLATFORM FOR PROVIDING INTERACTIVE APPLICATIONS ON A DIGITAL CONTENT PLATFORM

(75) Inventors: James R. Everingham, Santa Cruz, CA (US); Will Scullin, Sunnyvale, CA (US); Chris Waterson, Incline Village, NE (US)

(73) Assignee: Luminate, Inc., Mountain View, CA (US)

( * ) Notice: Subject to any disclaimer, the term of this patent is extended or adjusted under 35 U.S.C. 154(b) by 0 days.

(21) Appl. No.: 13/308,401

(22) Filed: Nov. 30, 2011

(65) Prior Publication Data

US 2013/0089273 A1 Apr. 11, 2013

Related U.S. Application Data

(60) Provisional application No. 61/543,717, filed on Oct. 5, 2011.

(51) Int. Cl.
*G06K 9/00* (2006.01)

(52) U.S. Cl.
USPC .......................... 382/100; 382/305; 382/306

(58) Field of Classification Search
USPC .................................. 382/305, 100; 707/705
See application file for complete search history.

(56) References Cited

U.S. PATENT DOCUMENTS

| D297,243 | S | 8/1988 | Wells-Papanek et al. |
|---|---|---|---|
| 4,789,962 | A | 12/1988 | Berry et al. |
| 5,008,853 | A | 4/1991 | Bly et al. |
| 5,199,104 | A | 3/1993 | Hirayama |
| 5,287,448 | A | 2/1994 | Nicol et al. |
| 5,349,518 | A | 9/1994 | Zifferer et al. |
| 5,367,623 | A | 11/1994 | Iawi et al. |
| 5,428,733 | A | 6/1995 | Carr |
| 5,463,727 | A | 10/1995 | Wiggins et al. |
| 5,513,305 | A | 4/1996 | Maghbouleh |
| 5,583,655 | A | 12/1996 | Tsukamoto et al. |
| 5,589,892 | A | 12/1996 | Knee et al. |
| 5,615,367 | A | 3/1997 | Bennett et al. |
| 5,627,958 | A | 5/1997 | Potts et al. |
| D384,050 | S | 9/1997 | Kodosky |
| D384,052 | S | 9/1997 | Kodosky |

(Continued)

OTHER PUBLICATIONS

Cascia et al., "Combining Textual and Visual Cues for Content-based Image Retrieval on the World Wide Web," IEEE Workshop on Content-based Access of Image and Video Libraries (Jun. 1998).

(Continued)

*Primary Examiner* — Tom Y Lu
(74) *Attorney, Agent, or Firm* — Michael B. Rubin; Bozicevic, Field & Francis LLP

(57) ABSTRACT

Systems and methods for providing interactive applications. In one embodiment, the systems and methods may include: (a) identifying digital content published on digital content platforms (e.g., images published on webpages); (b) assigning a key to the digital content; and (c) processing the digital content through a tagging engine (e.g., a crowdsource network) to tag the content with contextual data. The systems and methods may further include: (d) maintaining a data repository, wherein the content and respective data are indexed by corresponding key; (e) receiving a data request from an enabled application, upon user-activation of the application, wherein the data request includes the key; (f) conducting a data search of the data repository based on the key; and (g) providing the content data, responsive to the data request, for rendering of the enabled and user-activated application.

15 Claims, 8 Drawing Sheets

(56) References Cited

U.S. PATENT DOCUMENTS

| | | | |
|---|---|---|---|
| 5,682,469 A | 10/1997 | Linnett et al. |
| 5,684,716 A | 11/1997 | Freeman |
| 5,689,669 A | 11/1997 | Lynch et al. |
| 5,706,507 A | 1/1998 | Schloss |
| 5,721,906 A | 2/1998 | Siefert |
| 5,724,484 A | 3/1998 | Kagami et al. |
| 5,754,176 A | 5/1998 | Crawford |
| 5,796,932 A | 8/1998 | Fox et al. |
| D406,828 S | 3/1999 | Newton et al. |
| 5,933,138 A | 8/1999 | Driskell |
| 5,956,029 A | 9/1999 | Okada et al. |
| 6,026,377 A | 2/2000 | Burke |
| 6,034,687 A | 3/2000 | Taylor et al. |
| D427,576 S | 7/2000 | Coleman |
| 6,285,381 B1 | 9/2001 | Sawano et al. |
| D450,059 S | 11/2001 | Itou |
| 6,356,908 B1 | 3/2002 | Brown et al. |
| 6,414,679 B1 | 7/2002 | Miodonski et al. |
| D469,104 S | 1/2003 | Istvan et al. |
| 6,513,035 B1 | 1/2003 | Tanaka et al. |
| 6,728,752 B1 | 4/2004 | Chen et al. |
| 6,731,311 B2 | 5/2004 | Bufe et al. |
| D495,715 S | 9/2004 | Gildred |
| 7,069,308 B2 | 6/2006 | Abrams |
| D528,552 S | 9/2006 | Nevill-Manning |
| D531,185 S | 10/2006 | Cummins |
| 7,117,254 B2 | 10/2006 | Lunt et al. |
| 7,124,372 B2 | 10/2006 | Brin |
| 7,159,185 B1 | 1/2007 | Vedula et al. |
| D544,877 S | 6/2007 | Sasser |
| 7,231,395 B2 | 6/2007 | Fain et al. |
| 7,233,316 B2 | 6/2007 | Smith et al. |
| 7,251,637 B1 | 7/2007 | Caid et al. |
| D550,681 S | 9/2007 | Totten et al. |
| D553,632 S | 10/2007 | Harvey et al. |
| D555,661 S | 11/2007 | Kim |
| D557,275 S | 12/2007 | De Mar et al. |
| D562,840 S | 2/2008 | Cameron |
| D566,716 S | 4/2008 | Rasmussen et al. |
| D567,252 S | 4/2008 | Choe et al. |
| 7,383,510 B2 | 6/2008 | Pry |
| D575,298 S | 8/2008 | Chen et al. |
| D577,365 S | 9/2008 | Flynt et al. |
| 7,428,504 B2 | 9/2008 | Song |
| 7,437,358 B2 | 10/2008 | Arrouye et al. |
| 7,502,785 B2 | 3/2009 | Chen et al. |
| D590,412 S | 4/2009 | Saft et al. |
| 7,519,200 B2 | 4/2009 | Gokturk et al. |
| 7,519,595 B2 | 4/2009 | Solaro et al. |
| D592,221 S | 5/2009 | Rehling et al. |
| 7,542,610 B2 | 6/2009 | Gokturk et al. |
| D596,642 S | 7/2009 | Rehling et al. |
| 7,558,781 B2 | 7/2009 | Probst et al. |
| D599,358 S | 9/2009 | Hoefnagels et al. |
| D599,812 S | 9/2009 | Hirsch |
| D599,813 S | 9/2009 | Hirsch |
| D600,704 S | 9/2009 | LaManna et al. |
| D600,706 S | 9/2009 | LaManna et al. |
| 7,599,938 B1 | 10/2009 | Harrison, Jr. |
| D610,159 S | 2/2010 | Matheny et al. |
| 7,657,100 B2 | 2/2010 | Gokturk et al. |
| 7,657,126 B2 | 2/2010 | Gokturk et al. |
| 7,660,468 B2 | 2/2010 | Gokturk et al. |
| D612,862 S | 3/2010 | Fletcher et al. |
| D613,299 S | 4/2010 | Owen et al. |
| D613,750 S | 4/2010 | Truelove et al. |
| D614,638 S | 4/2010 | Viegers et al. |
| D617,808 S | 6/2010 | Thompson et al. |
| 7,760,917 B2 | 7/2010 | Vanhoucke et al. |
| D622,730 S | 8/2010 | Krum et al. |
| 7,774,333 B2 | 8/2010 | Colledge et al. |
| 7,783,135 B2 | 8/2010 | Gokturk et al. |
| 7,792,818 B2 | 9/2010 | Fain et al. |
| D626,133 S | 10/2010 | Murphy et al. |
| 7,809,722 B2 | 10/2010 | Gokturk et al. |
| D629,411 S | 12/2010 | Weir et al. |
| D633,511 S | 3/2011 | Cameron et al. |
| D638,025 S | 5/2011 | Saft et al. |
| 7,945,653 B2 | 5/2011 | Zuckerberg et al. |
| D643,044 S | 8/2011 | Ording |
| 8,024,345 B2 | 9/2011 | Colledge et al. |
| 8,027,940 B2 | 9/2011 | Li et al. |
| 8,036,990 B1 | 10/2011 | Mir et al. |
| 8,055,688 B2 | 11/2011 | Giblin |
| 8,060,161 B2 | 11/2011 | Kwak |
| 8,065,184 B2 | 11/2011 | Wright et al. |
| D652,424 S | 1/2012 | Cahill et al. |
| D653,260 S | 1/2012 | Vance et al. |
| 8,095,540 B2 | 1/2012 | Parikh et al. |
| D655,719 S | 3/2012 | Zaman et al. |
| 8,136,028 B1 | 3/2012 | Loeb et al. |
| D657,379 S | 4/2012 | Vance et al. |
| 8,166,383 B1 | 4/2012 | Everingham et al. |
| D658,668 S | 5/2012 | Spears et al. |
| 8,175,922 B2 | 5/2012 | Jones et al. |
| D661,312 S | 6/2012 | Vance et al. |
| 8,234,168 B1 | 7/2012 | Lagle Ruiz et al. |
| D664,976 S | 8/2012 | Everingham |
| D664,977 S | 8/2012 | Everingham |
| D665,397 S | 8/2012 | Naranjo et al. |
| D666,208 S | 8/2012 | Spears et al. |
| D666,209 S | 8/2012 | Cranfill |
| 8,250,145 B2 | 8/2012 | Zuckerberg et al. |
| 8,255,495 B1 | 8/2012 | Lee |
| D669,086 S | 10/2012 | Boyer et al. |
| 8,280,959 B1 | 10/2012 | Zuckerberg et al. |
| 8,311,889 B1 | 11/2012 | Lagle Ruiz et al. |
| 8,392,538 B1 | 3/2013 | Lee |
| D686,238 S | 7/2013 | Poston et al. |
| 8,495,489 B1 | 7/2013 | Everingham |
| D691,622 S | 10/2013 | Shaffer |
| D692,445 S | 10/2013 | Stovicek |
| D696,679 S | 12/2013 | Bae et al. |
| 8,635,519 B2 | 1/2014 | Everingham et al. |
| D698,801 S | 2/2014 | Jung |
| 2001/0044758 A1 | 11/2001 | Talib et al. |
| 2002/0065844 A1 | 5/2002 | Robinson et al. |
| 2003/0050863 A1 | 3/2003 | Radwin |
| 2003/0131357 A1 | 7/2003 | Kim |
| 2003/0220912 A1 | 11/2003 | Fain et al. |
| 2004/0070616 A1 | 4/2004 | Hildebrandt et al. |
| 2005/0216300 A1 | 9/2005 | Appelman et al. |
| 2005/0235062 A1 | 10/2005 | Lunt et al. |
| 2005/0251760 A1 | 11/2005 | Sato et al. |
| 2006/0155684 A1 | 7/2006 | Liu et al. |
| 2006/0179453 A1 | 8/2006 | Kadie et al. |
| 2006/0265400 A1 | 11/2006 | Fain et al. |
| 2006/0265653 A1 | 11/2006 | Paasonen et al. |
| 2007/0027856 A1 | 2/2007 | Lee |
| 2007/0032244 A1 | 2/2007 | Counts et al. |
| 2007/0081744 A1* | 4/2007 | Gokturk et al. ............... 382/305 |
| 2007/0118520 A1* | 5/2007 | Bliss et al. ........................ 707/5 |
| 2007/0157119 A1 | 7/2007 | Bishop |
| 2007/0203903 A1 | 8/2007 | Attaran Rezaei et al. |
| 2007/0219968 A1 | 9/2007 | Frank |
| 2007/0255785 A1 | 11/2007 | Hayashi et al. |
| 2007/0258646 A1 | 11/2007 | Sung et al. |
| 2008/0004992 A1 | 1/2008 | King et al. |
| 2008/0016040 A1 | 1/2008 | Jones et al. |
| 2008/0046458 A1 | 2/2008 | Tseng et al. |
| 2008/0079696 A1 | 4/2008 | Shim et al. |
| 2008/0082426 A1 | 4/2008 | Gokturk et al. |
| 2008/0091723 A1 | 4/2008 | Zuckerberg et al. |
| 2008/0134088 A1 | 6/2008 | Tse et al. |
| 2008/0141110 A1 | 6/2008 | Gura |
| 2008/0163379 A1* | 7/2008 | Robinson et al. ............... 726/27 |
| 2008/0177640 A1 | 7/2008 | Gokturk et al. |
| 2008/0199075 A1 | 8/2008 | Gokturk et al. |
| 2008/0208849 A1 | 8/2008 | Conwell |
| 2008/0268876 A1 | 10/2008 | Gelfand et al. |
| 2008/0306933 A1 | 12/2008 | Valliani et al. |
| 2009/0006375 A1 | 1/2009 | Lax et al. |
| 2009/0007012 A1 | 1/2009 | Mandic et al. |
| 2009/0064003 A1 | 3/2009 | Harris et al. |

(56) References Cited

U.S. PATENT DOCUMENTS

| | | |
|---|---|---|
| 2009/0070435 A1 | 3/2009 | Abhyanker |
| 2009/0113475 A1 | 4/2009 | Li |
| 2009/0125544 A1 | 5/2009 | Brindley |
| 2009/0144392 A1 | 6/2009 | Wang et al. |
| 2009/0148045 A1 | 6/2009 | Lee et al. |
| 2009/0158146 A1 | 6/2009 | Curtis et al. |
| 2009/0159342 A1 | 6/2009 | Markiewicz et al. |
| 2009/0165140 A1* | 6/2009 | Robinson et al. ............... 726/26 |
| 2009/0171964 A1 | 7/2009 | Eberstadt et al. |
| 2009/0193032 A1 | 7/2009 | Pyper |
| 2009/0228838 A1 | 9/2009 | Ryan et al. |
| 2009/0287669 A1 | 11/2009 | Bennett |
| 2010/0005001 A1 | 1/2010 | Aizen et al. |
| 2010/0005087 A1 | 1/2010 | Basco |
| 2010/0046842 A1 | 2/2010 | Conwell |
| 2010/0054600 A1 | 3/2010 | Anbalagan et al. |
| 2010/0054601 A1 | 3/2010 | Anbalagan et al. |
| 2010/0063961 A1 | 3/2010 | Guiheneuf |
| 2010/0077290 A1 | 3/2010 | Pueyo |
| 2010/0161631 A1 | 6/2010 | Yu et al. |
| 2010/0191586 A1 | 7/2010 | Veeramachaneni et al. |
| 2010/0260426 A1 | 10/2010 | Huang et al. |
| 2010/0287236 A1 | 11/2010 | Amento et al. |
| 2010/0290699 A1 | 11/2010 | Adam et al. |
| 2010/0312596 A1 | 12/2010 | Saffari et al. |
| 2010/0313143 A1 | 12/2010 | Jung et al. |
| 2011/0010676 A1 | 1/2011 | Khosravy |
| 2011/0022958 A1 | 1/2011 | Kang et al. |
| 2011/0072047 A1 | 3/2011 | Wang et al. |
| 2011/0082825 A1 | 4/2011 | Sathish |
| 2011/0087990 A1 | 4/2011 | Ng et al. |
| 2011/0131537 A1 | 6/2011 | Cho et al. |
| 2011/0138300 A1 | 6/2011 | Kim et al. |
| 2011/0164058 A1 | 7/2011 | Lemay |
| 2011/0173190 A1 | 7/2011 | van Zwol et al. |
| 2011/0184814 A1 | 7/2011 | Konkol et al. |
| 2011/0196863 A1 | 8/2011 | Marcucci et al. |
| 2011/0243459 A1 | 10/2011 | Deng |
| 2011/0264736 A1 | 10/2011 | Zuckerberg et al. |
| 2011/0276396 A1 | 11/2011 | Rathod |
| 2011/0280447 A1 | 11/2011 | Conwell |
| 2011/0288935 A1 | 11/2011 | Elvekrog et al. |
| 2011/0296339 A1 | 12/2011 | Kang |
| 2012/0005209 A1 | 1/2012 | Rinearson et al. |
| 2012/0036132 A1 | 2/2012 | Doyle |
| 2012/0054355 A1 | 3/2012 | Arrasvuori et al. |
| 2012/0059884 A1 | 3/2012 | Rothschild |
| 2012/0075433 A1 | 3/2012 | Tatzgern et al. |
| 2012/0110464 A1 | 5/2012 | Chen et al. |
| 2012/0158668 A1 | 6/2012 | Tu et al. |
| 2012/0185343 A1 | 7/2012 | Jones |
| 2012/0203651 A1 | 8/2012 | Leggatt |
| 2012/0205436 A1 | 8/2012 | Thomas et al. |
| 2012/0231425 A1 | 9/2012 | Calman et al. |
| 2012/0233000 A1 | 9/2012 | Fisher et al. |
| 2012/0233143 A1 | 9/2012 | Everingham |
| 2012/0258776 A1 | 10/2012 | Lord et al. |
| 2012/0287469 A1 | 11/2012 | Tomiyasu et al. |
| 2012/0290387 A1 | 11/2012 | Davis |
| 2013/0063561 A1 | 3/2013 | Stephan |

OTHER PUBLICATIONS

Everingham et al., "'Hello! My name is . . . Buffy'—Automatic Naming of Characters in TV Video," Proceedings of the 17th British Machine Vision Conference (BMVC2006), pp. 889-908 (Sep. 2006).

FAQ from Pixazza's website as published on Feb. 22, 2010, retrieved at http://web.archive.org/web/20100222001945/http://www.pixazza.com/faq/.

Galleguillos et al., "Object Categorization using Co-Occurrence, Location and Appearance," IEEE Conference on Computer Vision and Pattern Recognition (CVPR) Anchorage, USA (2008).

Heitz & Koller, "Learning Spatial Context: Using Stuff to Find Things," European Conference on Computer Vision (ECCV) (2008).

Hoiem et al., "Putting Objects in Perspective," IJCV (80), No. 1 (Oct. 2008).

Jain et al., "Fast Image Search for Learned Metrics," Proceedings of the IEEE Conference on Computer Vision and Pattern Recognition (CVPR) (Jun. 2008).

Lober et al., "IML: An Image Markup Language," Proceedings, American Medical Informatics Association Fall Symposium, pp. 403-407 (2001).

Rao, Leena Google Ventures-Backed Pixazza Raises $12 Million for Crowdsourced 'AdSense for Images', published Jul. 18, 2010, retrieved from http://techcrunch.com/2010/07/18google-funded-pixazza-raises-12-million-for-crowdsourced-adsense-for-images/.

Russell & Torralba, "LabelMe: a database and web-based tool for image annotation," International Journal of Computer Vision, vol. 77, Issue 1-3, pp. 157-173 (May 2008).

Torralba, "Contextual Priming for Object Detection," International Journal of Computer Vision, vol. 53, Issue 2, pp. 169-191 (2003).

Venkatesan et al., "Robust Image Hashing" Image Processing Proceedings. 2000 International Conference vol. 3, 664-666 (2000).

* cited by examiner

PLATFORM FOR PROVIDING INTERACTIVE APPLICATIONS ON A DIGITAL CONTENT PLATFORM

CROSS-REFERENCE TO RELATED APPLICATIONS

This application claims the benefit of U.S. Provisional Patent Application Ser. No. 61/543,717, filed Oct. 5, 2011, under 35 U.S.C. §119(e)(1), the entire disclosure of which is herein incorporated by reference in its entirety.

SUMMARY

Disclosed herein are systems and methods for providing interactive applications on a digital content platform. In one embodiment, the systems and methods are used for facilitating the enablement, activation, and rendering of interactive applications on a digital content platform (e.g., a webpage, mobile application, etc.). Such systems and methods may include: (a) identifying digital content published on digital content platforms (e.g., images published on webpages); (b) assigning a key to the digital content; and (c) processing the digital content through a tagging engine (e.g., a crowdsource network) to tag the images with contextual data. The systems and methods further include: (d) maintaining a data repository, wherein the content and respective contextual data are indexed by corresponding key; (e) receiving a data request from an enabled application, upon user-activation of the enabled application, wherein the data request includes the key; (f) conducting a data search of the data repository based on the key; and (g) providing the contextual data, responsive to the data request, for rendering of the enabled and user-activated application.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DEFINITIONS

Figure 1:
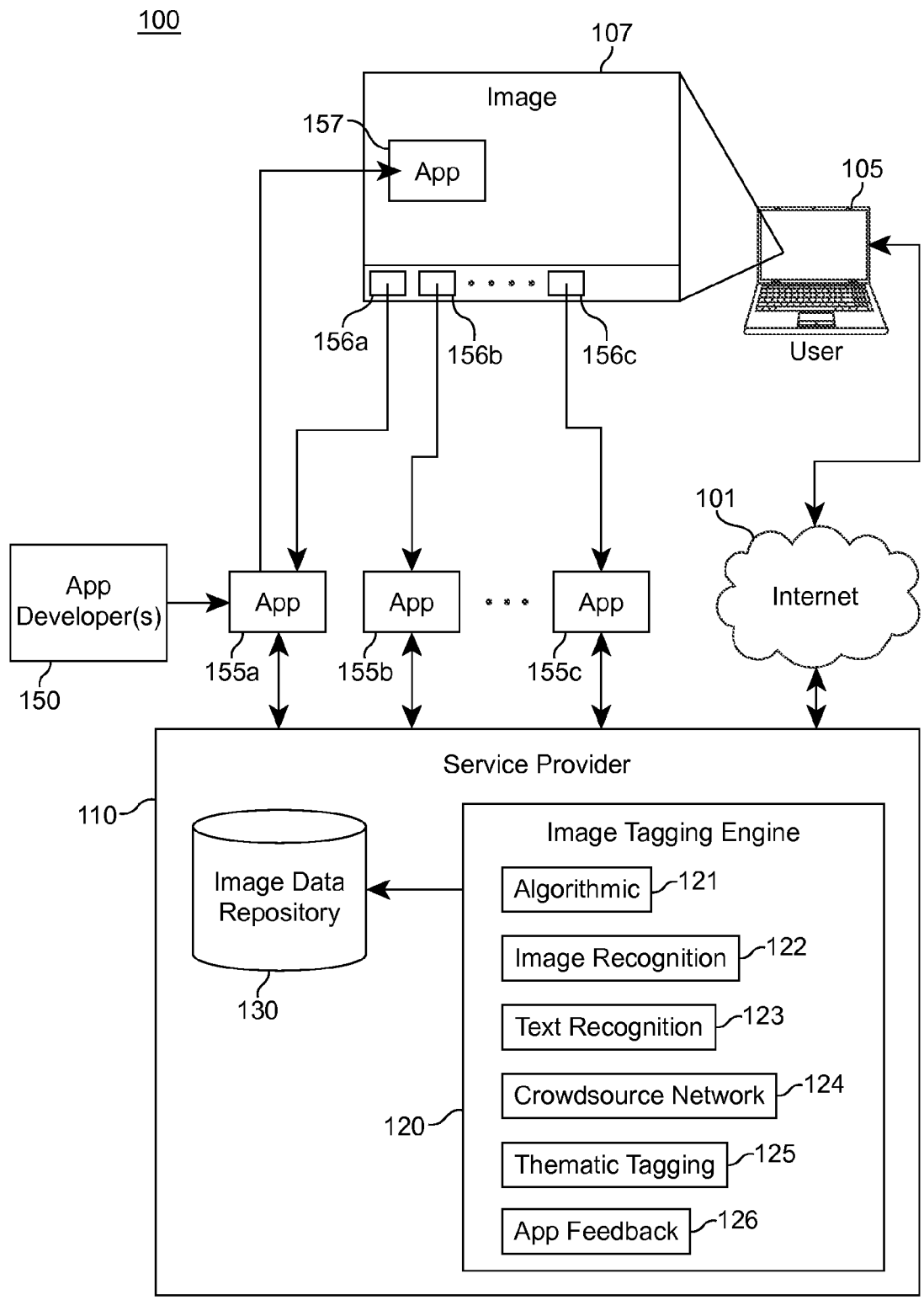
FIG. 1 is a high-level diagram illustrating an embodiment of the present invention.

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

Contextual Information or Contextual Tag: data related to the contents and/or context of digital content (e.g., an image, or content within the image); for example, but not limited to, a description, identification, index, or name of an image, or object, or scene, or person, or abstraction within the digital content (e.g., image).

Crowdsource Network: One or more individuals, whether human or computer, used for a crowdsourcing application.

Crowdsourcing: The process of delegating a task to one or more individuals, with or without compensation.

Digital content: broadly interpreted to include, without exclusion, any content available on a digital content platform, such as images, videos, text, audio, and any combinations and equivalents thereof.

Digital content platform: broadly interpreted to include, without exclusion, any webpage, website, browser-based web application, software application, mobile device application (e.g., phone or tablet application), TV widget, and equivalents thereof.

Image: a visual representation of an object, or scene, or person, or abstraction, in the form of a machine-readable and/or machine-storable work product (e.g., one or more computer files storing a digital image, a browser-readable or displayable image file, etc.). As used herein, the term "image" is merely one example of "digital content."

Proximate: is intended to broadly mean "relatively adjacent, close, or near," as would be understood by one of skill in the art. The term "proximate" should not be narrowly construed to require an absolute position or abutment. For example, "content displayed proximate to an image," means "content displayed relatively near an image, but not necessarily abutting or within the image." (To clarify: "content displayed proximate to an image," also includes "content displayed abutting or within the image.") In another example, "content displayed proximate to an image," means "content displayed on the same screen page or web page as the image."

Before the present invention is described in greater detail, it is to be understood that this invention is not limited to particular embodiments described, and as such may vary. It is also to be understood that the terminology used herein is for the purpose of describing particular embodiments only, and is not intended to be limiting. The scope of the present invention will be limited only by the appended claims.

RELATED APPLICATIONS

Except for any term definitions that conflict with the term definitions provided herein, the following related, co-owned, and co-pending applications are incorporated by reference in their entirety: U.S. patent application Ser. Nos. 12/902,066; 13/005,217; 13/005,226; 13/045,426; 29/387,270; 29/387,271; 29/387,272; 29/387,273; 13/151,110; 13/219,460; 13/252,053; and 13/299,280.

DETAILED DESCRIPTION

Disclosed herein are systems and methods for providing interactive applications on a digital content platform. In one embodiment, the systems and methods are used for facilitating the enablement, activation, and rendering of interactive applications on a digital content platform. Such systems and methods may include: (a) identifying digital content published on digital content platforms; (b) assigning a key to the digital content; and (c) processing the digital content through a tagging engine to tag the images with contextual data. The systems and methods further include: (d) maintaining a data repository, wherein the content and respective contextual data are indexed by corresponding key; (e) receiving a data request from an enabled application, upon user-activation of the enabled application, wherein the data request includes the key; (f) conducting a data search of the data repository based on the key; and (g) providing the contextual data, responsive to the data request, for rendering of the enabled and user-activated application. In one particular embodiment, the digital content includes images published on a webpage. The tagging engine may include a crowdsource network to identify the context of the image and provide contextual tags. Additional embodiments and examples are provided below.

The following detailed description of the figures refers to the accompanying drawings that illustrate exemplary embodiments. Other embodiments are possible. Modifications may be made to the embodiments described herein without departing from the spirit and scope of the present invention. Therefore, the following detailed description is not meant to be limiting.

FIG. 1 is a high-level diagram illustrating an embodiment of the present invention. More specifically, FIG. 1 illustrates a system 100 for facilitating the enablement, activation, and/or rendering of interactive applications (or "apps") proximate to digital content published on a digital content platform (e.g., an image published on a webpage). As shown, a user 105 accesses a digital content platform (e.g., a webpage) through an Internet connection 101. Typically, digital content, such as an image 107, published or otherwise displayed on a webpage, is static and provides limited interactivity with the user. However, image 107 provides an opportunity to interact with a user, provide additional content, and/or serve as "online real estate" for providing contextually relevant advertisements. As will be described below, system 100 provides a platform for providing interactive content and/or applications for a user 105, relevant to the published digital content.

As shown in FIG. 1, one or more application developer(s) 150 may provide one or more interactive applications 155a, 155b, 155c, for enablement, activation, and rendering on published digital content (e.g., image 107). In practice, applications 155a, 155b, and/or 155c can be enabled by the application developer 150, a service provider 110, and/or the publisher of the digital content. Enablement of the applications provides the user with a palette of applications to choose from. In the example shown in FIG. 1, the user 105 can then activate one or more of the enabled applications by selecting a respective icon or hotspot 156a, 156b, 156c on image 107. User-activation of the selected application then pulls image data available for the image 107 in order to render an in-image interactive application 157 proximate to the image. (The use of the term "in-image" should not be interpreted to require a fixed positional relationship between the image and the application. For example, in one embodiment, an "in-image application" may be rendered proximate to the image; i.e., inside or outside the image boundary/frame, near the image, on the same screen as the image, on the same webpage as the image; or any other equivalent position relative to the image.)

In order for the enablement, activation, and/or rendering of the in-image application to be relevant to the image, the application developer(s) 150 may require detailed contextual information (or data) on the contents/context of the image 107. In practice, the contextual data is provided by a service provider 110. More specifically, service provider 110 implements various interfaces and sub-protocols to identify published content, analyze the content, index and maintain the data available on the content, and provide contextual data to the enabled and activated applications 155a, 155b, 155c. For example, the service provider 110 can pull digital images published on webpages, and process the images through an image tagging engine 120. Within image tagging engine 120, the service provider 110 employs techniques such as: algorithmic identification 121 or analysis of the image; image recognition protocols 122 and analysis of the image; proximate text recognition 123 in search of contextual information of the image based on text published proximate to the image; submission of the image to a crowdsource network 124 to identify the context of the image and tag the image with relevant data; a thematic tagging engine 125 to identify and tag the image with relevant data, based on a pre-defined theme; an application feedback engine 126 to receive use-feedback from an enabled, activated, and rendered application; and/or any combinations or equivalents thereof. Information/data obtained or developed respective to the image is then stored in an image data repository 130. In one embodiment, the image data is indexed within image data repository 130 via a unique image key, uniform resource locator (URL), or equivalents thereof. As such, inquiries and/or searches upon image data repository 130 may quickly and effectively provide all relevant data available for use in an interactive in-image application.

Figure 2:
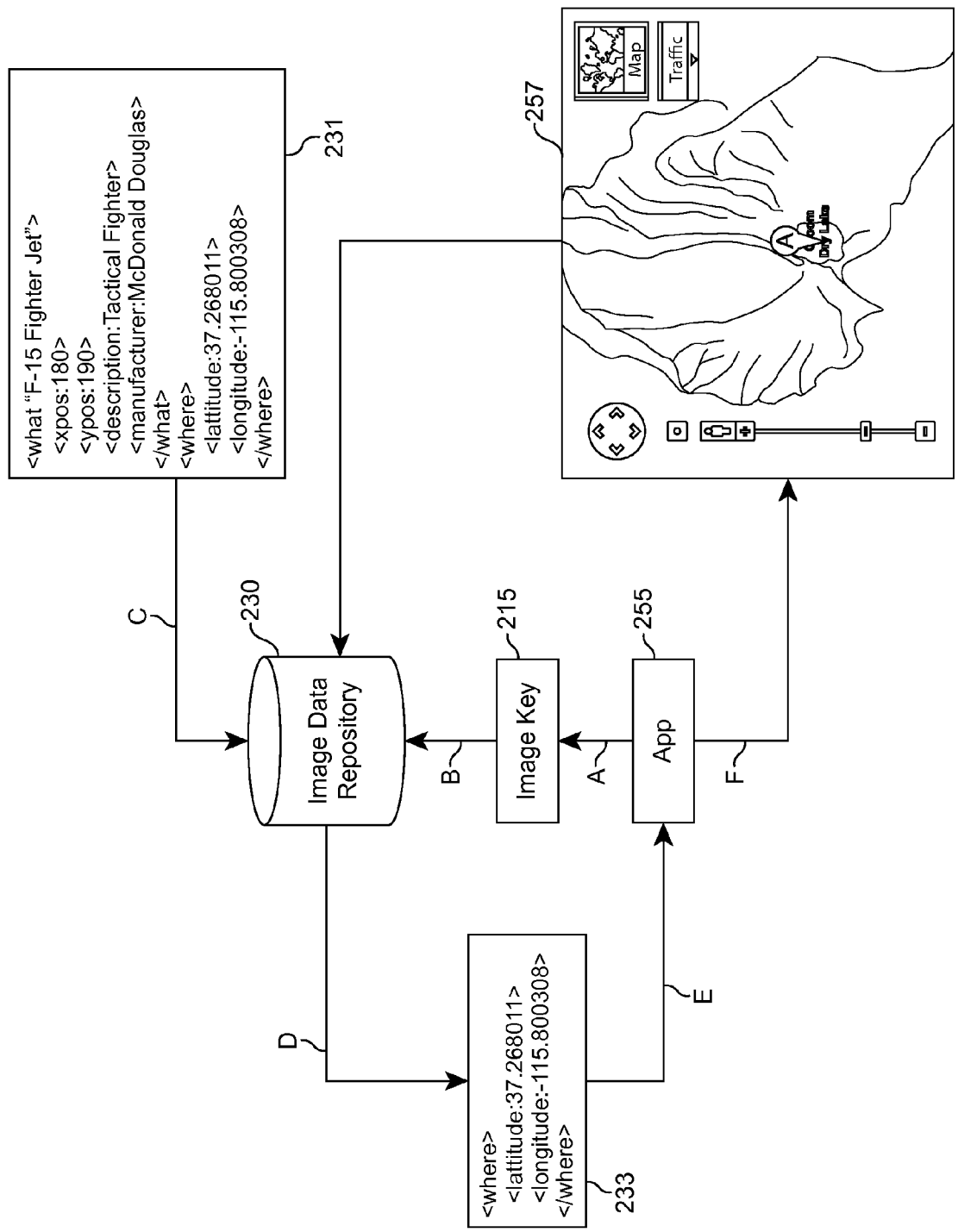
FIG. 2 is a high-level diagram illustrating another embodiment of the present invention.

FIG. 2 is a high-level diagram illustrating an example implementation of the system 100 of FIG. 1. The labeling of arrows A-F indicates the process flow of the implementation. As shown in FIG. 2, an application 255 is activated by a user. The activated application then pulls the unique image key 215 of the image (A), and provide such image key to the service provider (B). The image key 215 is used to conduct a search of the relevant data 231 obtained by the service provider based on processing of the image (C). In some instances, application 255 may request all available data on the image. However, in some instances, application 255 may only request specific data 233 (D) for rendering of the application 257 (F). For example, if the function of the application is to provide a map of a location shown on the image, the image data repository 230 may provide the location data 233, identified by analysis of the image, for rendering of an in-image map application 257.

Figure 3:
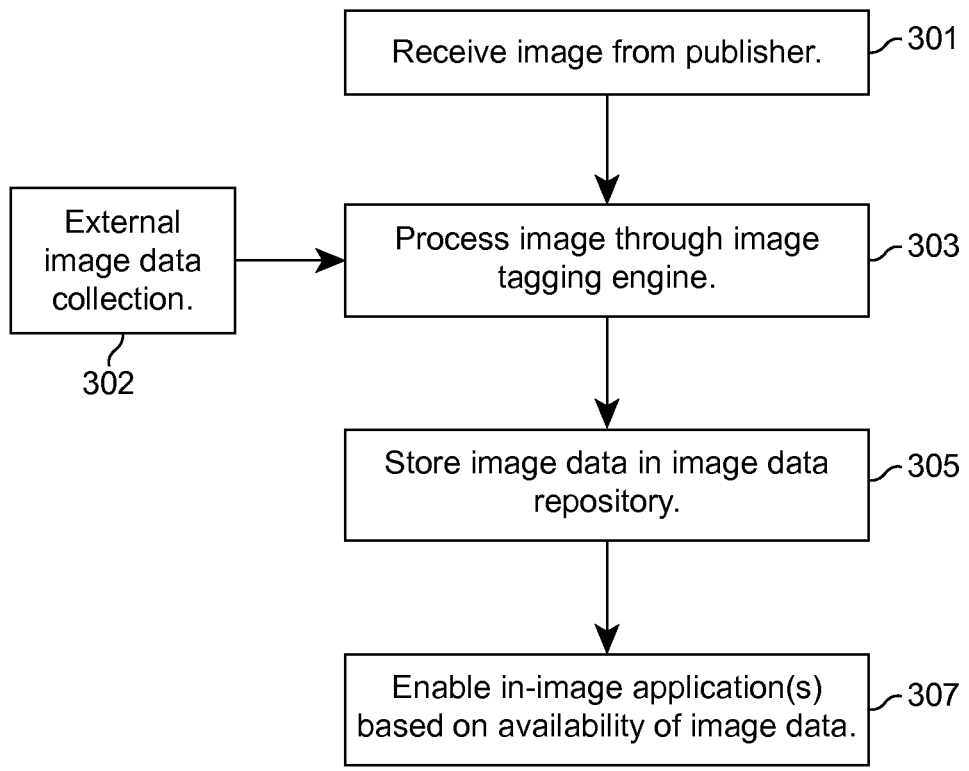
FIG. 3 is a flowchart illustrating an embodiment presented.

FIG. 3 is a flowchart illustrating an embodiment presented. More specifically, FIG. 3 shows a method 300 for processing digital content (e.g., a published digital image). In step 301, one or more images are received from one or more publishers. In one embodiment, a service provider provides an interface for one or more publishers to submit images that are (or will be) published. In another embodiment, a service provider "scrapes" the images from the publishers' digital platform(s). For example, the service provider may implement a "widget" (e.g., a line of software (e.g., HTML) code inserted into a publisher's webpage) to identify the images being published on the digital content platform. Such widget can then push the images to the service provider for processing.

In step 302, external data, corresponding to the image, is collected. For example, any existing metadata is collected on the image. Such metadata may be included amongst the contextual database entry created for the image. In step 303, the image is processed through an image tagging engine to obtain additional relevant and contextually specific data. For example, in one embodiment, the image is submitted to a crowdsource network, wherein the image is evaluated and analyzed. The crowdsource network can return one or more contextual tags, identifiers, or other data that can later be used by one or more interactive applications.

In step 305, the image data is stored in an image data repository. For example, an image data repository (e.g., a database on a server) may store the image data with or without an actual copy of the image. In one embodiment, the image data is stored and indexed by a unique image key identifier.

The image key may be used as a means for identifying, searching, and/or retrieving the stored image data. In operation, when an enabled and activated in-image application requires image data, the image key can be used to identify the respective image in an image data request.

In step 307, the service provider may enable in-image applications based on the availability of image data. For example, the service provider may manage a catalog of available in-image applications. Each application may require different image data in order to effectively function for its intended purpose. However, the required image data may or may not be available. As such, the service provider can determine whether sufficient image data is available in order to effectively render the application useful. If the image data is not available, the application can be disabled. If the image data is available, the application can be enabled. A publisher may also be given the option of choosing which in-image applications should be enabled/disabled.

Figure 4:
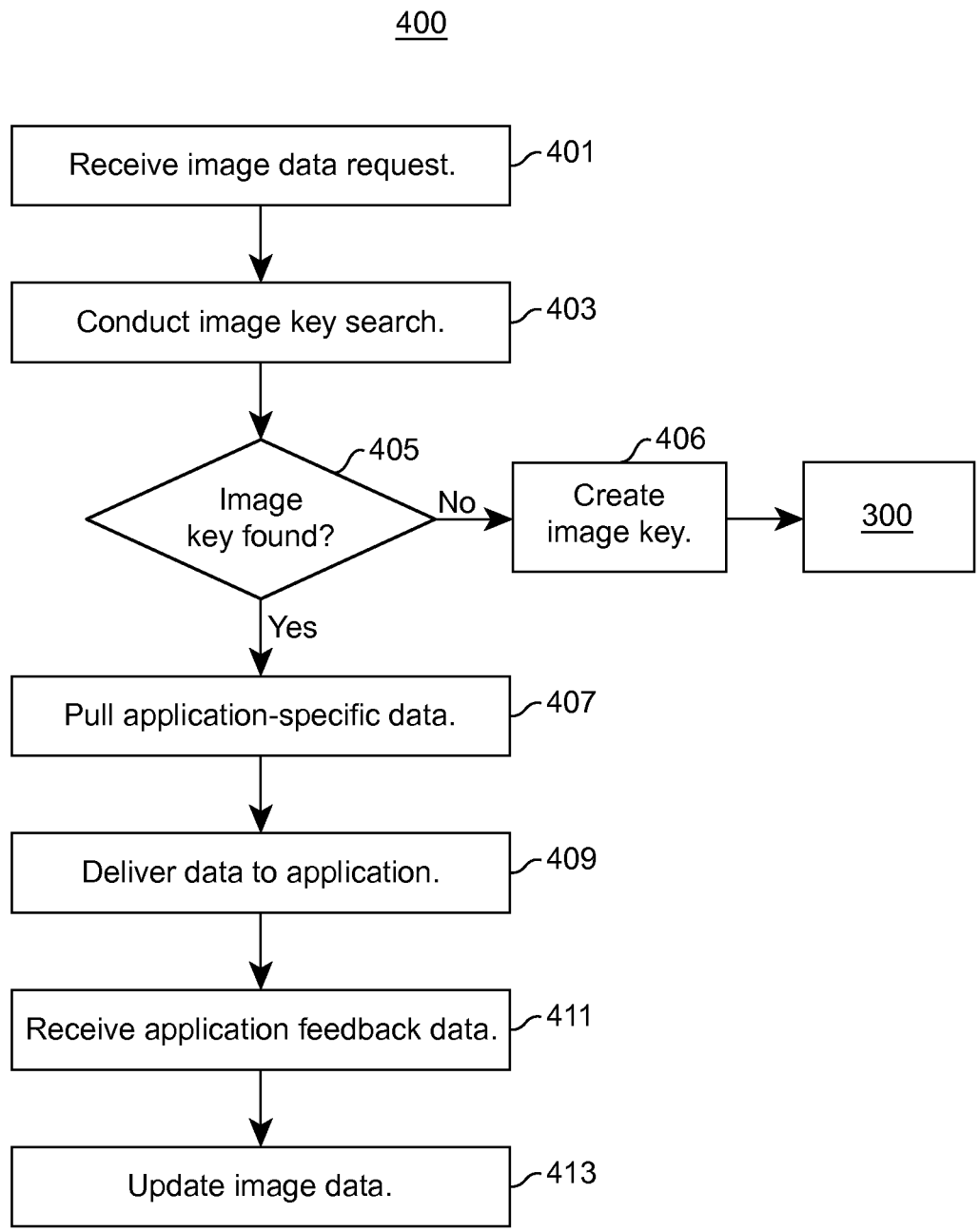
FIG. 4 is a flowchart illustrating another embodiment presented.

FIG. 4 is a flowchart illustrating another embodiment presented. More specifically, FIG. 4 illustrates a sub-protocol 400 implemented by a service provider after processing images through an image tagging engine. In step 401, an image data request is received from an in-image interactive application. Such image request typically arrives to the service provider from an in-image application interface, wherein the end-user activates a hotspot (or application icon) on the image to activate the in-image application. In step 403, an image key search is performed based on the image data request. In step 405, a determination is made as to whether the image includes an associated image key. If the image does not include an image key, a decision is made as to whether to create an image key, in step 406, and/or process the image through an image tagging engine (or sub-protocol 300). However, if an image key is available, then the application-specific image data is pulled from the image data repository, in step 407. The image data is delivered to the activated in-image application, in step 409. Optionally, a feedback interface may be provided to receive application (or use) feedback data, in step 411. In step 413, the image data may be updated in the image data repository for future use.

Figure 5:
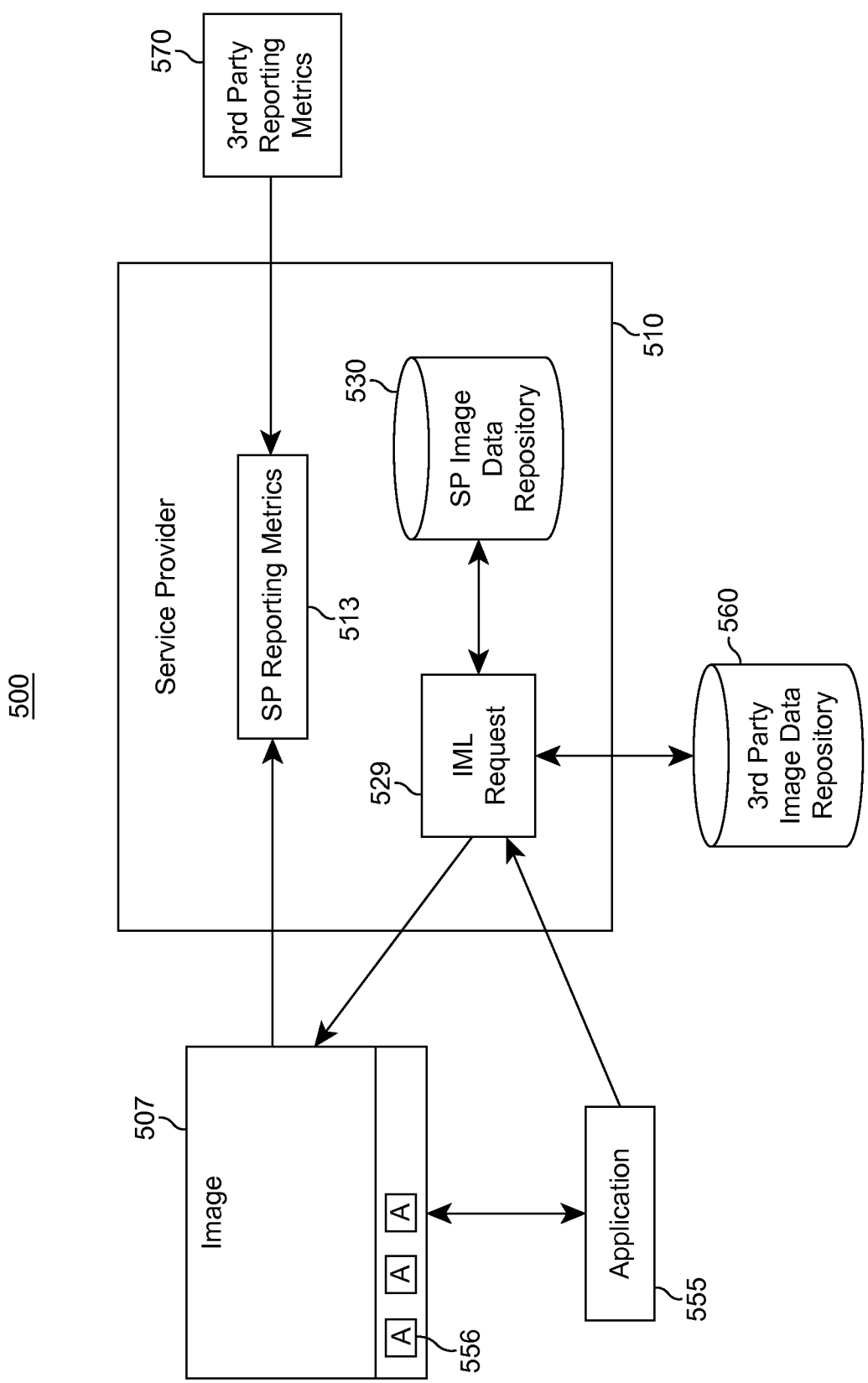
FIG. 5 is a high-level diagram illustrating another embodiment of the present invention.

FIG. 5 is a high-level diagram illustrating another embodiment of the present invention. More specifically, FIG. 5 shows a system 500, which includes use of both an internal (i.e., service provider managed) image data repository 530, and an external (i.e., third-party managed) image data repository 560. In the embodiment shown in FIG. 5, an application 555 is activated by user-activation of a hotspot (or icon) 556 on a published image 507. The image key for image 507 is pulled (or pushed) by application 555, and provided to an image markup language (IML) request management module 529. The IML request module 529 determines whether the image data needed for rendering of the application 555 is maintained in the service provider image data repository 530 or the third-party image data repository 560. The IML request module 529 then pulls (or pushes) the necessary data, and provides the data for rendering of the application 555 proximate the image 507. Use-feedback can then be collected by service provider reporting metrics 513 and/or third-party reporting metrics 570. As such, a complete and more robust image data system may be provided in order to facilitate the rendering of content-rich, interactive in-image applications.

Figure 6:
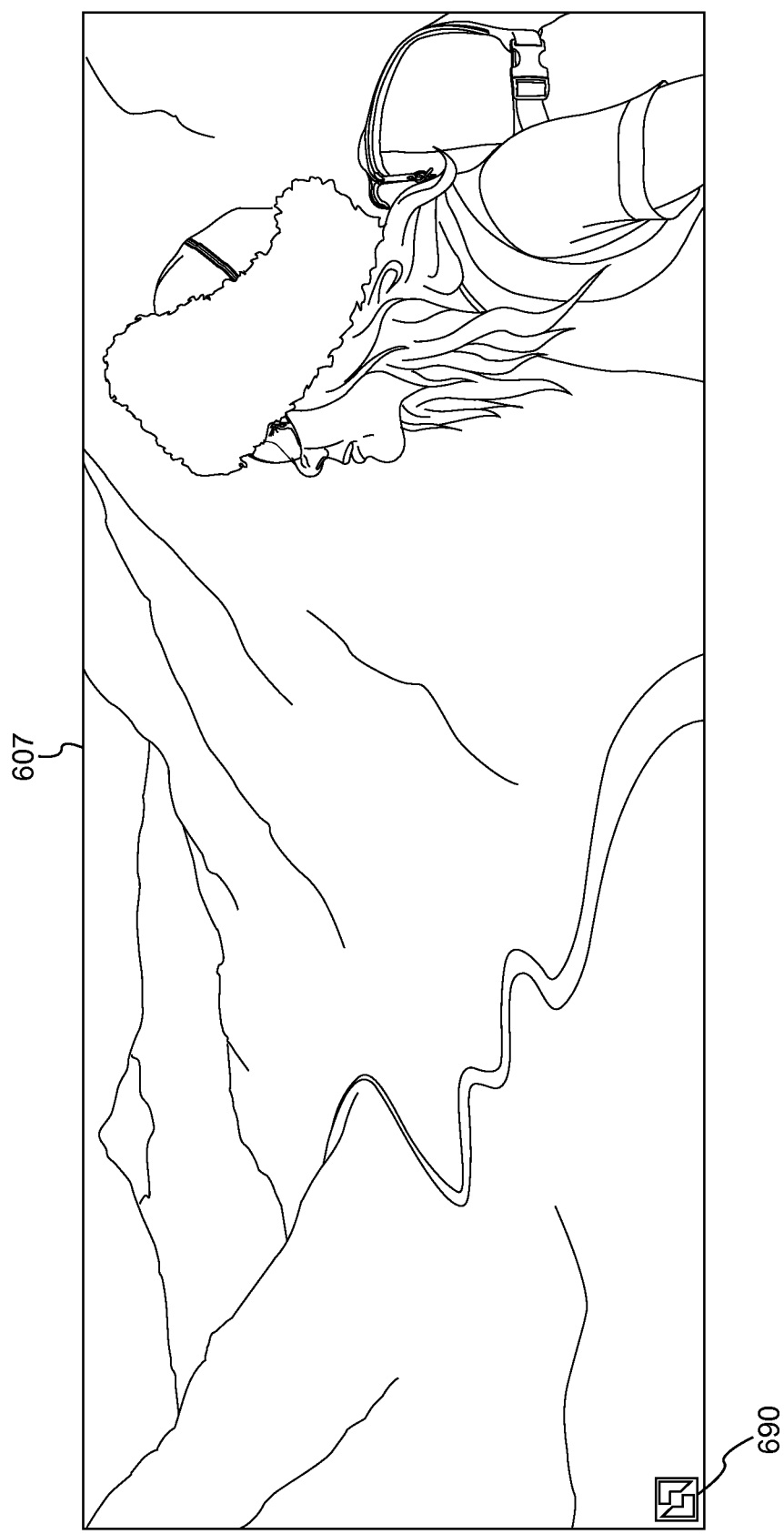
FIG. 6 is a screenshot illustrating an implementation of the present invention.
Figure 7:
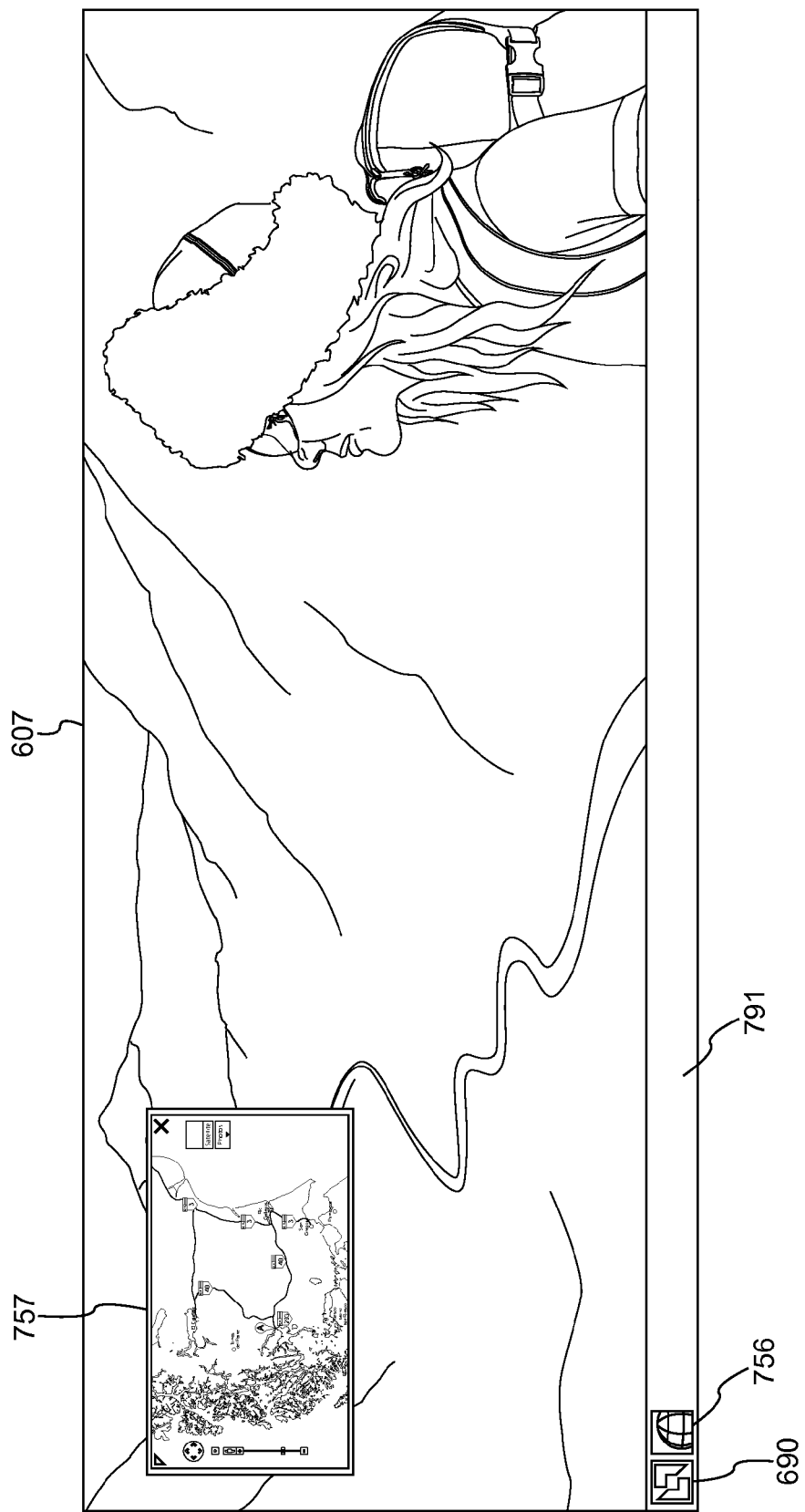
FIG. 7 is another screenshot illustrating an implementation of the present invention.

FIGS. 6 and 7 are screenshots illustrating an implementation of the present invention. In practice, an end-user may expose an application palette (or application user-interface) 791 by activation of a hotspot 690 on published digital image 607. One or more enabled in-image interactive applications may then be displayed along application palette 791. In the embodiment shown, an in-image application 756 may be a map display application. Upon user-activation of the application icon 756, the image key of the image 607 is provided to a service provider, as described above. The service provider then returns image data specific to the activated application. In the embodiment shown, such image data may include location data specific to the location depicted within the image. The activated application may then render an overlay 757 showing a map of the location shown in the image (or other functional rendering of the application). In one embodiment, the application and/or service provider rewrites the publisher's HTML in order to overlay the interactive application and relevant content over the published image.

Additional Embodiments

In another embodiment, there is provided a computer-implemented method for facilitating the rendering of in-image applications, the method comprising: (a) identifying a digital image published on a digital content platform; (b) assigning an image key to the digital image; (c) processing the digital image through an image tagging engine to tag the image with one or more contextual tags; (d) maintaining an image data repository, wherein the one or more contextual tags are indexed by the image key; (e) providing the digital content platform with the image key for linking to the published image; (f) providing the digital content platform with an in-image application interface; (g) enabling one or more in-image applications based on the one or more contextual tags; (h) receiving a data request from an enabled in-image application, upon user-activation of the enabled in-image application, wherein the data request includes the image key; (i) conducting a data search of the image data repository based on the image key; and (j) providing the one or more contextual tags, responsive to the data request, for rendering of the enabled and user-activated in-image application. The image tagging engine may comprise a crowdsource network, proximate-text recognition, and/or thematic tagging. The method may further comprise: (k) receiving use feedback from the rendered in-image application; (l) supplementing the one or more contextual tags with use feedback; and/or (m) overlaying the rendered in-image application on the digital content platform.

In another embodiment, there is provided a computer-implemented system for facilitating the rendering of in-image applications, the system comprising: (a) an image identification interface to identify digital images published on one or more digital content platforms; (b) an image tagging engine for tagging images with contextual tags; (c) an image data repository storing the contextual tags linked to respective digital images, wherein the digital images are indexed by an image key; and (d) an in-image application interface to: (1) receive a data request from an enabled in-image application, upon user-activation of the enabled in-image application, wherein the data request includes the image key, (2) conduct a data search of the image data repository based on the image key, and (3) provide image data, responsive to the data request, for rendering of the enabled and user-activated in-image application. The image tagging engine may comprise a crowdsource network, proximate-text recognition, and/or thematic tagging. The in-image application interface may further comprise overlaying the rendered in-image application on the digital content platform, based on the image data.

In another embodiment, there is provided computer-implemented systems and methods for facilitating the rendering of interactive applications, respective to digital images published on a digital content platform. The systems and methods include means for identifying digital images published on one or more digital content platforms. Such means may include: (1) an interface for receiving images from a digital publisher; (2) computer software or "widget" (e.g., a line of software (e.g., HTML) that scrapes images from publishers' digital platform(s); (3) computer software or widget that pushes digital images to a service provider for processing; (4) computer software or widget that "walks the DOM" to identify digital images published on a digital content platform; or combinations or equivalents thereof.

The systems and methods further include means for tagging digital images with contextual data. Such means may include: (1) an image tagging engine for tagging images with contextual tags; (2) an algorithmic identification or analysis of the image; (3) image recognition protocols and analysis of the image; (4) proximate text recognition in search of contextual information of the image based on text published proximate to the image; (5) a crowdsource network to identify the context of the image and tag the image with relevant data; (6) a thematic tagging engine to identify and tag the image with relevant data, based on a pre-defined theme; (7) an application feedback engine to receive use-feedback from an enabled, activated, and rendered application; (8) and/or any combinations or equivalents thereof.

The systems and methods may further include means for storing the contextual data linked to respective digital images. Such means may include an image data repository, database, server, or combinations or equivalents thereof.

The systems and methods may further include means for indexing the digital images and/or data. Such means may include a URL, unique code, image key, or combinations or equivalents thereof.

The systems and methods may further include means for (1) receiving a data request from an enabled in-image application, upon user-activation of the enabled in-image application; (2) conducting a data search of the means for storing the contextual data; (3) providing image/contextual data, responsive to the data request, for rendering of the enabled and user-activated in-image application; and/or (4) overlaying the rendered in-image application on the digital content platform, based on the image context/data. Such means may include an in-image application interface, computer software code, network connection interface, and combinations or equivalents thereof.

In one embodiment, there is provided a computer-implement method for providing an interactive digital image platform. The computer-implemented systems and methods presented include: (a) creating an image database populated with a plurality of images from a plurality of publishers; (b) using a computer algorithm, image recognition engine, crowdsourcing network, or application interface to identify and tag data relevant to each of the plurality of images; (c) providing a publisher with a catalog of interactive applications that can be applied to published images; (d) receiving an image key identifying a published image; (e) identifying what data is available in the image database for the published image identified by the image key; (f) identifying one or more publisher-selected interactive applications that may be applied to the published image from step (d); (g) enabling the interactive applications from step (f); and (h) rewriting the publisher's HTML in order to overlay the interactive application and relevant content over the image of step (d).

The systems and methods provided allow a service provider to provide a publisher (e.g., a web publisher) with a catalog of interactive image applications. The service provider can then enable/disable the selected applications based on whether there is sufficient or appropriate data on the image to support the functionality of the application. The image applications can overlay images published on the publisher's digital platform (e.g., website) and allow an end-user (e.g., website user) to interact with and/or obtain additional content from the image. The interactive application may be activated by the user with, for example, a mouse-over of the image. In one embodiment, a widget (e.g., line of HTML code) is inserted into the publishers' website(s). The widget walks the document object model tree (i.e., "walks the DOM") to identify images that are being published. The image key (or URL) of the published images are forwarded (or otherwise provided) to the service provider.

In one embodiment, there is provided a method comprising: (a) allowing a publisher to select one or more interactive applications from a catalog of available applications; (b) identifying a published image on a publisher's digital platform; (c) identifying whether the data available on the published image is sufficient to support the function of each of the one or more selected applications; (d) enabling the interactive applications that are supported by the image data; (e) providing a user of the digital platform with access to the one or more interactive applications that are enabled; and (f) running the interactive application on the publisher's digital platform. Interactive applications may also be end-user selected.

Communication Between Parties Practicing the Present Invention

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 8, below.

Computer Implementation

Figure 8:
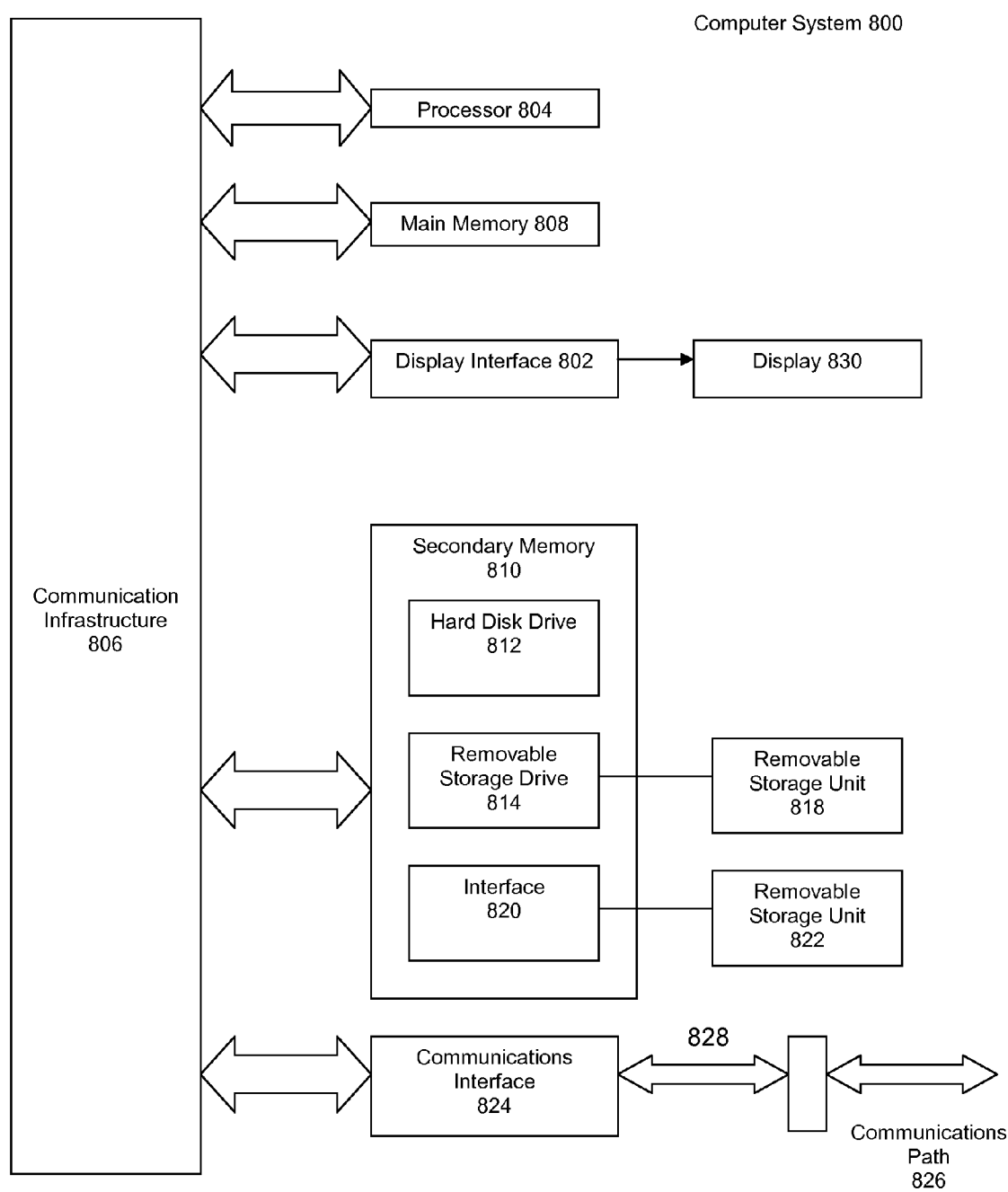
FIG. 8 is a schematic drawing of a computer system used to implement the methods.

In one embodiment, the invention is directed toward one or more computer systems capable of carrying out the functionality described herein. For example, FIG. 8 is a schematic drawing of a computer system 800 used to implement the methods presented above. Computer system 800 includes one or more processors, such as processor 804. The processor 804 is connected to a communication infrastructure 806 (e.g., a communications bus, cross-over bar, or network). Computer system 800 can include a display interface 802 that forwards graphics, text, and other data from the communication infrastructure 806 (or from a frame buffer not shown) for display on a local or remote display unit 830.

Computer system 800 also includes a main memory 808, such as random access memory (RAM), and may also include a secondary memory 810. The secondary memory 810 may include, for example, a hard disk drive 812 and/or a removable storage drive 814, representing a floppy disk drive, a magnetic tape drive, an optical disk drive, flash memory device, etc. The removable storage drive 814 reads from and/or writes to a removable storage unit 818. Removable storage unit 818 represents a floppy disk, magnetic tape, optical disk, flash memory device, etc., which is read by and written to by removable storage drive 814. As will be appreciated, the removable storage unit 818 includes a computer usable storage medium having stored therein computer software, instructions, and/or data.

In alternative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow computer software, instructions, and/or data to be transferred from the removable storage unit 822 to computer system 800.

Computer system 800 may also include a communications interface 824. Communications interface 824 allows computer software, instructions, and/or data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical, or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 814, removable storage units 818, 822, data transmitted via communications interface 824, and/or a hard disk installed in hard disk drive 812. These computer program products provide computer software, instructions, and/or data to computer system 800. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features of the present invention, as discussed herein. In particular, the computer programs, when executed, enable the processor 804 to perform the features of the presented methods. Accordingly, such computer programs represent controllers of the computer system 800. Where appropriate, the processor 804, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 800 using removable storage drive 814, interface 820, hard drive 812, communications interface 824, or equivalents thereof. The control logic (software), when executed by the processor 804, causes the processor 804 to perform the functions and methods described herein.

In another embodiment, the methods are implemented primarily in hardware using, for example, hardware components such as application specific integrated circuits (ASICs) Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium for facilitating the rendering of in-image applications on a digital content platform, comprising instructions executable by at least one processing device that, when executed, cause the processing device to: (a) identify a digital image published on a digital content platform; (b) assign an image key to the digital image; (c) process the digital image through an image tagging engine to tag the image with one or more contextual tags; (d) store the one or more contextual tags, indexed by the image key, in an image data repository; (e) receive a data request from an enabled in-image application, upon user-activation of the enabled in-image application, wherein the data request includes the image key; (f) conduct a data search of the image data repository based on the image key; and (g) provide the one or more contextual tags, responsive to the data request, for rendering of the enabled and user-activated in-image application. The computer-readable storage medium may further include instructions executable by at least one processing device that, when executed, cause the processing device to: (h) provide the digital image to a crowdsource network; (i) perform proximate-text recognition of the digital image on the digital content platform; (j) submit the digital image to a thematic tagging engine; (k) receive use feedback from the rendered in-image application; (l) supplement the one or more contextual tags with use feedback; and/or (m) provide the digital image to overlay the rendered in-image application on the digital content platform.

In another embodiment, there is provided a computer-readable storage medium for facilitating the rendering of in-image applications on a digital content platform, comprising instructions executable by at least one processing device that, when executed, cause the processing device to: (a) identify digital images published on one or more digital content platforms; (b) process and/or tag the images via an image tagging engine for tagging images with contextual tags; (c) stored the contextual tags in an image data repository, linked to respective digital images, wherein the digital images are indexed by an image key; and (d) provide an in-image application interface to: (1) receive a data request from an enabled in-image application, upon user-activation of the enabled in-image application, wherein the data request includes the image key, (2) conduct a data search of the image data repository based on the image key, and (3) provide image data, responsive to the data request, for rendering of the enabled and user-activated in-image application.

Conclusion

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A computer-implemented method for facilitating the rendering of third-party in-image applications in connection with images published on webpages, the method comprising:
   (a) providing a webpage publisher with software code for insertion into a webpage, wherein the software code, when executed, functions to identify an image that has been published on the webpage and submit the image to a service provider's computer system;
   the service provider's computer system performing the steps of
   (b) assigning an image key to the image;
   (c) processing the image through an image tagging engine, wherein the image tagging engine tags the image with one or more contextual tags based on the content within the image;
   (d) maintaining an image data repository, wherein the one or more contextual tags are indexed by the image key;
   (e) providing the webpage publisher with the image key for linking to the published image;
   (f) providing the webpage publisher with an in-image application interface;
   (g) enabling one or more third-party in-image applications based on the one or more contextual tags;
   (h) receiving a data request from an enabled in-image application, upon user-activation of the enabled in-image application, wherein the data request includes the image key;
   (i) conducting a data search of the image data repository based on the image key; and
   (j) providing the one or more contextual tags, responsive to the data request, for rendering of the enabled and user-activated third-party in-image application, wherein the third-party in-image application uses the contextual tags to perform its respective function.

2. The method of claim 1, further comprising:
   receiving use feedback from the rendered in-image application; and
   supplementing the one or more contextual tags with use feedback.

3. The method of claim 1, further comprising:
   overlaying the rendered in-image application on the image on the webpage.

4. A computer-implemented system for facilitating the rendering of third-party in-image applications on one or more digital content platforms, the system comprising:
   (a) an image identification interface which identifies digital images published on one or more digital content platforms;
   (b) an image tagging engine which tags images with contextual tags based on the content within the image;
   (c) an image data repository storing the contextual tags linked to respective digital images, wherein the digital images are indexed by an image key; and
   (d) an in-image application interface which: (1) receives a data request from an enabled third-party in-image application, upon user-activation of the enabled third-party in-image application, wherein the data request includes the image key, (2) conducts a data search of the image data repository based on the image key, and (3) provides image data, responsive to the data request, for rendering of the enabled and user-activated third-party in-image application, wherein the third-party in-image application uses the image data to perform its respective function.

5. The system of claim 4, wherein the image tagging engine comprises proximate-text recognition.

6. The system of claim 4, wherein the image tagging engine comprises thematic tagging.

7. The system of claim 4, wherein the in-image application interface further comprises: (4) overlaying the rendered in-image application on the digital content platform, based on the image data.

8. A non-transitory computer-readable storage medium for facilitating the rendering of third-party in-image applications in connection with images published on webpages, comprising:
   instructions executable by at least one processing device that, when executed, cause the processing device to
   (a) receive identification of an image that has been published on a webpage;
   (b) assign an image key to the image;
   (c) process the image through an image tagging engine, wherein the image tagging engine tags the image with one or more contextual tags based on the content within the image;
   (d) store the one or more contextual tags, indexed by the image key, in an image data repository;
   (e) receive a data request from an enabled third-party in-image application, upon user-activation of the enabled third-party in-image application, wherein the data request includes the image key;

(f) conduct a data search of the image data repository based on the image key; and (g) provide the one or more contextual tags, responsive to the data request, for rendering of the enabled and user-activated third-party in-image application, wherein the third-party in-image application uses the contextual tags to perform its respective function.

9. The non-transitory computer-readable storage medium of claim 8, further comprising:

instructions executable by at least one processing device that, when executed, cause the processing device to perform proximate-text recognition of the image on the webpage.

10. The non-transitory computer-readable storage medium of claim 8, further comprising:

instructions executable by at least one processing device that, when executed, cause the processing device to submit the digital image to a thematic tagging engine.

11. The non-transitory computer-readable storage medium of claim 8, further comprising:

instructions executable by at least one processing device that, when executed, cause the processing device to receive use feedback from the rendered in-image application; and supplement the one or more contextual tags with use feedback.

12. The non-transitory computer-readable storage medium of claim 8, further comprising:

instructions executable by at least one processing device that, when executed, cause the processing device to overlay the rendered in-image application on the webpage.

13. A non-transitory computer-readable storage medium for facilitating the rendering of one or more third-party in-image applications in connection with an image published on a webpage, comprising:

instructions executable by at least one processing device that, when executed, cause the processing device to (a) receive identification of an image that has been published on a webpage;

(b) submit the image to an image tagging engine to identify contextual data for the image;

(c) receive a request for the contextual data, from a third-party in-image application, upon user-activation of the third-party in-image application; and (d) provide the contextual data, responsive to the request, for rendering of the user-activated third-party in-image application on the webpage, wherein the third-party in-image application uses the contextual data to perform its respective function.

14. The non-transitory computer-readable storage medium of claim 13, further comprising:

instructions executable by at least one processing device that, when executed, cause the processing device to determine whether the contextual data needed for rendering of the in-image application is maintained in a service provider image data repository or a third-party image data repository.

15. The non-transitory computer-readable storage medium of claim 14, further comprising:

instructions executable by at least one processing device that, when executed, cause the processing device to receive use feedback from the rendered in-image application; and update a reporting metric for the image based on the use feedback.

* * * * *